United States Patent [19]

Pommer et al.

[11] 3,860,654

[45] Jan. 14, 1975

[54] PRODUCTION OF 6,10-DIMETHYLUNDECATRIENE-(3,5,10)-ONE-(2)

[75] Inventors: Horst Pommer; Werner Reif; Heinrich Pasedach; Werner Hoffmann, all of Ludwigshafen, Germany

[73] Assignee: Badische Anilin- & Soda-Fabrik Aktiengesellschaft, Rheinland-Pfalz, Germany

[22] Filed: Sept. 23, 1970

[21] Appl. No.: 74,939

Related U.S. Application Data

[63] Continuation-in-part of Ser. No. 702,202, Feb. 1, 1968, abandoned.

[30] Foreign Application Priority Data

Feb. 4, 1967 Germany............................ 1286019

[52] U.S. Cl............... 260/595, 260/586 C, 260/483
[51] Int. Cl............................................ C07c 49/20
[58] Field of Search................. 260/587, 595, 593 R

[56] References Cited
UNITED STATES PATENTS
2,877,271    3/1959    Kaiser et al......................... 260/587
3,238,260    3/1966    Pasedach et al.................... 260/587

FOREIGN PATENTS OR APPLICATIONS
741,047    11/1955    Great Britain...................... 260/587

OTHER PUBLICATIONS

Noller, "Chemistry of Organic Compounds," 3rd Edition, pp. 101 and 598.

Merck Index, 7th Edition, pp. 1069.

Primary Examiner—Leon Zitver
Assistant Examiner—Gerald A. Schwartz
Attorney, Agent, or Firm—Johnston, Keil, Thompson & Shurtleff

[57] ABSTRACT

Production of β-ionone by reaction of 3,7-dimethylocten-(7)-yn-(1)-ol-(3) with diketene to form the acetoacetic ester of 3,7-dimethylocten-(7)-yn-(1)-ol-(3), decomposing the same at 100° to 400°C in the presence of an acid catalyst and/or after treating the mixture in the presence of the catalyst and cyclizing the 6,10-dimethylundecatrien-(3,5,10)-one-(2) obtained by treatment with concentrated sulfuric acid at temperatures of from −30° to 20°C.

2 Claims, No Drawings

PRODUCTION OF 6,10-DIMETHYLUNDECATRIENE-(3,5,10)-ONE-(2)

This application is a continuation-in-part of U.S. application Ser. No. 702,202 filed Feb. 1, 1968, now abandoned.

The present invention relates to an improved process for the production of β-ionone.

β-ionone is gaining increasing importance as a precursor of vitamin A for which demand is constantly growing. Considerable efforts have been made to develop a process which would provide β-ionone in pure form and good yields.

U.S. Pat. No. 2,661,368 describes a method of producing pseudoianone, a precursor of ionone, by reaction of 1-methyl-1-(4-methyl-3-penten-1-yl)-propargyl alcohol with diketene and thermal decarboxylation of the resultant acetoacetate (I) to form pseudoionone (II):

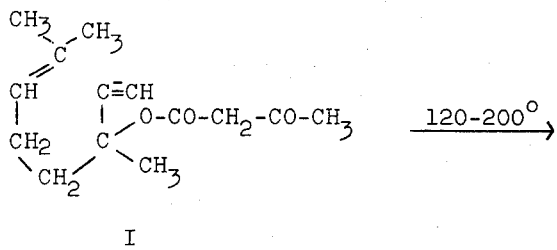

I

The yield of pseudoionone in this process is only 44–55% of the theory (cf. German Printed Application No. 1,021,354).

Thermal decarboxylation of the acetoacetate in the presence of aluminum tri(lower alkoxide) and a lower fatty acid as described in U.S. Pat. No. 2,839,579 does not give any appreciable improvement in the yield.

According to U.S. Pat. No. 3,238,260 the poor yields of pseudoionone II obtained in the thermal decarboxylation of the acetoacetate I are due to the formation of a five-membered cyclic ketone III:

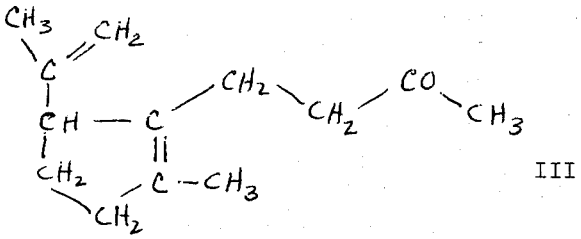

III

To avoid this side reaction it is suggested that ethynyl carbinols of formula IV or V:

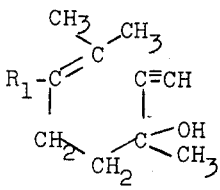

IV

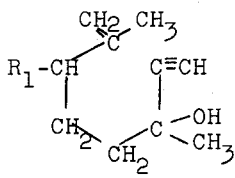

V be reacted with alcohols to form ethers having formula IV:

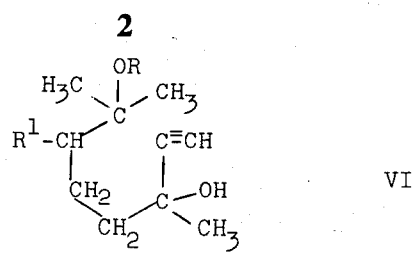

VI prior to the reaction to the corresponding acetoacetates and thermal decarboxylation.

It is known from German Pat. No. 1,000,374 that 6,10-dimethylundecatrien-(3,5,10)-one-(2) can be obtained in 60 to 65% yield from ethynyl carbinol V by reaction with acetoacetic esters and heating to 150° to 250°C.

Unfortunately, the product is not pure and contains many isomers. This is borne out by the fact that when the product is further processed into ionone a yield of only 56% of the theory is achieved.

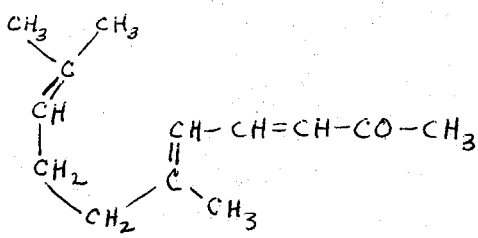

It is an object of this invention to provide a method that gives the desired β-ionone in higher yields.

We have found that, surprisingly, β-ionone is obtained in exceptionally good yield when a. the 3,7-dimethylocten (7)-yn-(1)-ol-(3) is reacted with diketene to form the new compound 3,7-dimethylocten-(7)-yn-(1)-ol-(3) acetoacetate, b. the latter is decomposed by heating at a temperature of from 100° to 400°C and the decomposition product is aftertreated by heating at from 100° to 400°C in the presence of about 0.01 to 10% by weight, with reference to the starting material, of an acid catalyst, preferably an aliphatic or aromatic carboxylic acid having from 1 to 20 carbon atoms, or by heating the 3,7-dimethylocten-(7)-yn-(1)-ol-(3) acetoacetate at from 100° to 400°C in the presence of about 0.01 to 10% by weight with reference to the starting material, of an acid catalyst, preferably an aliphatic or aromatic carboxylic acid having from 1 to 20 carbon atoms, and c. the 6,10-dimethylundecatrien-(3,5,10)-one-(2) obtained is cyclized by reaction with about two to six times by weight, preferably about three times by weight, of concentrated sulfuric acid at a temperature of from −30° to +20°C.

It is furthermore surprising that 3,7-dimethylocten-(7)-yn-(1)-ol-(3) acetoacetate and/or its decomposition product should, on heating in the presence of an acid, preferably an organic acid, give those isomers of 6,10-trimethylundecatrien-(3,5,10)-on-(2) (cis-trans and trans-trans) which can be readily cyclized to the desired β-ionone in very good yield.

The acetoacetic ester of 3,7-dimethylocten-(7)-yn-(1)-ol-(3) obtainable by reacting 3,7-dimethylocten-(7)yn-(1)-ol-(3) with diketene is a new substance having a characteristic fresh citrus-like odor.

The reaction of 3,7-dimethylocten-(7)-yn-(1)-ol-(3) with diketene may be carried out in a conventional manner, generally at temperatures of from 10° to 100°C, particularly from 30° to 60°C. In general a stoichiometric amount of diketene or a slight excess thereof of up to 10% is used. It is advisable to add an alkaline catalyst, for example an alkali metal alcoholate, alkali metal hydroxide or alkali metal carbonate. Alkali metals such as sodium and potassium which react with the acetylene alcohol to form its alkali metal compound may also be used. Aliphatic amines such as triethylamine are also suitable as catalysts.

The alkaline catalyst is used in a small amount, in general from 0.1 to 5% by weight with reference to the acetylene alcohol.

For the subsequent pyrolysis, use may be made of the crude reaction product of the abovementioned reaction or preferably a pure product which boils at 0.1 mm Hg in the range from 105° to 120°C and has a refractive index $n_D^{20}$ of from 1.4650 to 1.4670.

Pyrolysis is carried out at temperatures of from 100° to 400°C, particularly from 150° to 300°C, preferably from 180° to 210°C. Progress of the reaction can easily be followed because carbon dioxide is eliminated. The optimum reaction period (which is in general from 10 to 500 minutes) may easily be determined by experiment. It is essential that an acid catalyst should be present or that when elimination of carbon dioxide is over the product should be heated for some time, for example 10 to 500 minutes, in the presence of an acid catalyst at temperatures of from 100° to 400°C, preferably from 150 to 250°C and particularly from 175°C to 195°C. As the 3,7-dimethylocten-(7)-yn-(1)-ol-(3) acetoacetate or its pyrolysis product is heated in the presence of an acid catalyst, those isomers of the 6,10-dimethylundecatriene-(3,5,10)-one-(2) formed which are difficult to cyclize or not at all are converted into readily cyclizable isomers such as the cis-trans and trans-trans isomers. Conventional acid catalysts, such as inorganic or organic acids, Lewis acids, salts which have an acid reaction in aqueous solution (salts of weak bases and strong acids such as aluminum phosphate or partial salts of strong acids such as potassium hydrogen sulfate) and acid ion exchangers may be used. Acid aluminas are also suitable. Examples of suitable inorganic acids are sulfuric acid, hydrogen chloride, phosphoric acid and boric acid; suitable organic carboxylic acids are aliphatic and aromatic carboxylic acids having from 1 to 20 carbon atoms, for instance aliphatic monocarboxylic acids such as acetic acid and valeric acid, aliphatic dicarboxylic acids such as adipic acid, aromatic monocarboxylic acids such as benzoic acid, aromatic dicarboxylic acids such as phthalic isophthalic and terephthalic acids, and aromatic polycarboxylic acids such as trimellitic acid and pyromellitic acid.

It is preferred to use weak inorganic acids or carboxylic acids having from 1 to 20 carbon atoms. It is advantageous to choose an acid from which the product may be easily separated by distillation, such as benzoic acid or adipic acid. The amount of catalyst may vary within a wide range and in general is from 0.01 to 10% by weight with reference to the starting material. Strong acids are preferably used in amount of from 0.01 to 0.5% by weight and weak acids in an amount of from 0.5 to 10% by weight. The optimum amount of catalyst may easily be determined by experiment.

In general, solvents are not used. It is however possible to use inert solvents or diluents, such as aliphatic, cycloaliphatic or aromatic hydrocarbons, ethers or esters, particularly those having a boiling point above 150°C at atmospheric pressure. Polar aprotic solvents such as dimethylformamide, dimethyl sulfoxide or N-methylpyrrolidone, are preferred. The solvents or diluents are in general used in an amount which is 0.1 to 10 times the amount of the starting material.

The 6,10-dimethylundecatrien-(3,5,10)-one-(2) obtained may readily be purified by distillation. The product is a valuable starting material for the production if ionone.

Cyclization of the 6,10-dimethylundecatrien-(3,5,10)-one-(2) is effected by reaction with concentrated sulfuric acid at a temperature between −30° and +20°C in the presence of an aliphatic or aromatic hydrocarbon as solvent.

The sulfuric acid should be used for cyclization in 90 to 98, preferably 96 to 98% concentration. For carrying out the reaction, 6,10-dimethylundecatrien-(3,5,10)-one-(2) should be used in such an amount that one mole is present for every 5 to 15, preferably 5 to 12, moles of sulfuric acid. In general, an amount of sulfuric acid about three times the weight of 6,10-dimethylundecatrien-(3,5,10)-one-(2) is used.

All aliphatic and aromatic hydrocarbons may be used whose boiling points are below 200°C. Specific examples are propane, butane, pentane, hexane, cyclohexane, benzene and xylene, either alone or in any combination. The hydrocarbon is used in an amount of 1 to 15, preferably 2 to 14, parts by volume per part by volume of 6,10-dimethylundecatrien-(3,5,10)-one-(2).

The process may be carried out by contacting in the course of above 5 minutes while stirring, a mixture of sulfuric acid and a hydrocarbon at −30° to +20°C, preferably −20° to 0°C, with the 6,10-dimethylundecatrien-(3,5,10)-one-(2) in the said ratio, the heat of reaction being removed by a cooling bath, preferably methanol or ethanol cooled with dry ice. After 5 to 120, advantageously 5 to 60 and preferably about 15 minutes the product is worked up by conventional methods, i.e. by pouring onto ice, extracting with ether, washing the ethereal solution neutral with caustic soda solution, concentrating and distilling the residue.

The invention is further illustrated by the following Examples, in which parts are by weight.

EXAMPLE 1 a. Preparation of the acetoacetic ester 0.5 part of sodium is dissolved in 480 parts of 3,7-dimethylocten-(7)-yn-(1)-ol-(3) (purity 95%) and then 327 parts of diketene is added in the course of 2 hours at 50°C. Reaction is allowed to continue for another 5 hours at 60°C. The whole is then cooled to 5°C. 500 parts of ether is added, the product is washed with sodium carbonate and water until neutral, dried over sodium sulfate and filtered, and the ether is distilled off. The residue is distilled at subatmospheric pressure. 650 parts of the acetoacetic ester of 3,7-dimethylocten-(7)-yn-(1)-ol-(3) is obtained (92% yield). Boiling point at 0.2 to 1 mm Hg 107° to 115°C; $n_D^{25} = 1.4667$; acetylene alcohol content (silver nitrate method) 98%.

b. Pyrolysis in the presence of an acid catalyst 236 parts of 3,7-dimethylocten-(7)-yn-(1)-ol-(3) acetoacetate and 2 parts of benzoic acid are heated at 195° to 200°C for 50 minutes while stirring so that 22.7 liters of carbon dioxide is eliminated. In a crude distillation, 161 parts of distillate ($n_D^{25} = 1.5161$; acetylene alcohol content 10%; $E_{1\ cm}^{1\%}$ at 291 millimicrons 932 in ethanol) and 28 parts of residue are obtained.

Redistillation gives 15 parts of 3,7-dimethylocten-(7)-yn-(1)-ol-(3) and 125 parts of 6,10-dimethylundecatrien-(3,5,10)-one-(2). Boiling point at 0.05 mm Hg 84° to 95°C; $n_D^{25} = 1.5243$; $E_{1\ cm}^{1\%}$ at 291 millimicrons 1200 in ethanol; yield of pure substance 72.4%.

The pyrolysis according to this paragraph (b) is effected with other acid catalysts shown in the following table, similar results being obtained:

118 parts 3,7-dimethylocten-(7)-yn-(1)-ol-(3) acetoacetate are reacted at 150° to 200°C for 15 to 40 minutes until $CO_2$ evolution ceases.

| Catalyst | Parts by weight | $CO_2$ (liters) | 3,7-dimethyl-octen-(7)-yn-(1)-ol-(3) recovered (parts by weight) | 6,10-dimethyl-undecatrien-(3,5,10)-one-(2) $E_{1\ cm}^{1\%} = 1250$ at 291 mµ (parts by weight) | Yield |
|---|---|---|---|---|---|
| Adipic acid | 1.5 | 12.1 | 12.7 | 64.5 | 80.5% |
| Terephthalic acid | 1.0 | 11.5 | 3.3 | 64.7 | 70.5% |
| $KHSO_4$ | 1.0 | 12.2 | 12.0 | 59.5 | 73.5% |
| HCl a,° | 0.5 | 12.3 | 15.1 | 56.1 | 73.0% |
| $H_2SO_4$ | 0.2 | 12.2 | 28.5 | 41.0 | 71.5% |

(c) Cyclization to β-ionone

A mixture of 150 parts of 96% sulfuric acid and 50 parts of hexane is mixed in the course of 5 minutes at −10°C with a solution of 50 parts of 6,10-dimethylundecatrien-(3,5,10)-one-(2) in 50 parts of hexane, the reaction mixture is stirred for 15 minutes at −10°C, poured onto 500 parts of ice, and the whole extracted with ether. The ethereal solution is washed neutral with caustic soda solution, concentrated, and the residue distilled. 42.5 parts of β-ionone is obtained. This is 85% of the theory based on 6,10-dimethylundecatrien-(3,5,10)-one-(2) and 61.5% of the theory based on 3,7-dimethylocten-(7)-yn-(1)-ol-(3) fed in.

d. Pyrolysis in the absence of an acid catalyst 236 parts of 3,7-dimethylocten-(7)-yn-(1)-ol-(3) acetoacetate is heated for 50 minutes at 195° to 200°C while stirring, 22.3 liters of carbon dioxide being eliminated.

By crude distillation, 153 parts of distillate ($n_D^{25} = 1.5072$; acetylene alcohol content 9.3%; $E_1^{1\%}$ at 291 millimicrons 571 in ethanol) and 40 parts of residue are obtained.

Redistillation gives 13 parts of 3,7-dimethylocten-(7)-yn-(1)-ol-(3) and 110 parts of 6,10-dimethylundecatrien-(3,5,10)-one-(2). Boiling point at 0.05 mm Hg 85° to 100°C; $n_D^{25} = 1.5156$; $E_{1cm}^{1\%}$ at 291 millimicrons 886 in ethanol; yield 63.2%.

When 50 parts of this product is cyclized as described under (c), only 30 parts of β-ionone is obtained; yield of β-ionone, 60% with reference to 6,10-dimethylundecatrien-(3,5,10)-one-(2), and 38% with reference to 3,7-dimethylocten-(7)-yn-(1)-ol-(3).0.5 part of benzoic acid is added to 45 parts of crude 6,10-dimethylundecatrien-(3,5,10)-one-(2) ($E_{1\ cm}^{1\%}$ at 291 millimicrons 886 (ethanol), refractive index $n_D^{25} = 1.5156$) obtained as described under 1(d) and the mixture is stirred for 1 hour at 175°C. By distillation, 44 parts of a product is obtained having $E_{1\ cm}^{1\%}$ at 291 millimicrons of 1200 (ethanol) and $n_D^{25} = 1.5243$.

By cyclizing as described under 1 (c), 42.5 parts of β-ionone is obtained from 50 parts of this product; yield of β-ionone, 85% with reference to 6,10-dimethylundecatrien-(3,5,10)-one-(2).

We claim:
1. A process for the production of 6,10-dimethylundecatriene-(3,5,10)-one-(2) which comprises reacting 3,7-dimethylocten-(7)-yn-(1)-ol-(3) with diketene to form 3,7-dimethylocten-(7)-yn-(1)-ol-(3) acetoacetate, decomposing the 3,7-dimethylocten-(7)-yn-(1)-ol-(3) acetoacetate obtained by heating at a temperature of from 100° to 400°C. and aftertreating the decomposition product by heating at from 100° to 400° in the presence of about 0.01 to 10% by weight, with reference to the starting material, of an acid catalyst selected from the group consisting of acetic acid, valeric acid, adipic acid, benzoic acid, phthalic acid, isophthalic acid, terephthallic acid, trimellitic acid and pyromellitic acid.

2. A process for the production of 6,10-dimethylundecatrine-(3,5,10)-one-(2) which comprises reacting 3,7-dimethylocten-(7)-yn-(1)-ol-(3) with diketene to form 3,7-dimethylocten-(7)-yn-(1)-ol-(3) acetoacetate, decomposing the 3,7-dimethylocten-(7)-yn-(1)-ol-(3) acetoacetate obtained by heating at from 100° to 400°C in the presence of about 0.01 to 10% by weight, with reference to the starting material, of an acid catalyst selected from the group consisting of acetic acid, valeric acid, adipic acid, benzoic acid, phthalic acid, isophthalic acid, terephthalic acid, trimellitic acid and pyromellitic acid.

* * * * *

UNITED STATES PATENT OFFICE
CERTIFICATE OF CORRECTION

PATENT NO. : 3,860,654
DATED : January 14, 1975
INVENTOR(S) : Horst Pommer et al It is certified that error appears in the above-identified patent and that said Letters Patent are hereby corrected as shown below:

In the Abstract, Line 5, delete "after treating"
and substitute -- aftertreating --

In Column 6, Line 14 (Claim 1), delete "terephthallic"
and substitute -- terephthalic acid --

In Column 6, Line 2 (Claim 2), delete "dimethylundecatrine"
and substitute -- dimethylundecatriene --

Signed and Sealed this twenty-second Day of June 1976

[SEAL]

Attest:

RUTH C. MASON
Attesting Officer

C. MARSHALL DANN
Commissioner of Patents and Trademarks